(12) United States Patent
Hochholzer et al.

(10) Patent No.: US 9,731,953 B2
(45) Date of Patent: Aug. 15, 2017

(54) CYLINDER-AND-PISTON ASSEMBLY FOR A BOTTLE ATTACHMENT APPARATUS

(71) Applicant: BRAND GMBH + CO KG, Wertheim (DE)

(72) Inventors: Günter Hochholzer, Werbach (DE); Dieter Böhm, Wertheim (DE); Ottmar Kneucker, Helmstadt (DE); Markus Kurz, Wertheim (DE)

(73) Assignee: BRAND GMBH + CO KG, Wertheim (DE)

( * ) Notice: Subject to any disclaimer, the term of this patent is extended or adjusted under 35 U.S.C. 154(b) by 0 days.

(21) Appl. No.: 15/003,028

(22) Filed: Jan. 21, 2016

(65) Prior Publication Data

US 2016/0264391 A1    Sep. 15, 2016

(30) Foreign Application Priority Data

Mar. 9, 2015   (DE) .................... 20 2015 001 781 U

(51) Int. Cl.
*B67C 3/28*    (2006.01)
*B67C 3/26*    (2006.01)
(Continued)

(52) U.S. Cl.
CPC ............... *B67C 3/282* (2013.01); *B67C 3/26* (2013.01); *B67C 9/00* (2013.01); *G01F 11/023* (2013.01); *G01F 11/028* (2013.01)

(58) Field of Classification Search
CPC ..... B01L 2400/0478; B01L 2400/0605; B01L 3/0293; B05B 11/0032; B05B 11/3007;
(Continued)

(56) References Cited

U.S. PATENT DOCUMENTS 3,729,022 A    4/1973  Roach
3,940,027 A *  2/1976  Marterer ............... G01F 11/028
                                                      222/309
(Continued)

FOREIGN PATENT DOCUMENTS

DE    1 632 032 A1    8/1970
DE    26 33 723 A1    2/1977
(Continued)

OTHER PUBLICATIONS

Brand General Catalog 900 (Jun. 2013), pp. 334-341.

*Primary Examiner* — Frederick C Nicolas
*Assistant Examiner* — Bob Zadeh
(74) *Attorney, Agent, or Firm* — David S. Safran

(57) ABSTRACT

A cylinder-and-piston assembly for a bottle attachment apparatus for handling liquids in which the stroke length of the piston of the cylinder-and-piston assembly is delimited by a stroke length stop when suctioning from the cylinder and is delimited by a readjustment stop when exhausting into the cylinder. The readjustment stop is disposed on the piston or on the cylinder housing and interacts with a fixed stop. The readjustment stop is accessible and adjustable by way of a removable seal. The seal is connected by way of ribs to a piston bearing. The readjustment stop is disposed below this removable seal. The seal has a molding and the piston bearing has a counter molding. Displacement of the seal in relation to the piston bearing moves the seal in the longitudinal direction, and by this movement, the seal is removed in a manner that preferably is not capable of re-assembly.

16 Claims, 4 Drawing Sheets

(51) Int. Cl.
*B67C 9/00* (2006.01)
*G01F 11/02* (2006.01)

(58) Field of Classification Search
CPC ..... B05B 11/3015; B67C 3/26; B67C 3/2634; B67C 3/28; B67C 3/282; B67C 9/00; G01F 11/023; G01F 11/028
See application file for complete search history.

(56) References Cited

U.S. PATENT DOCUMENTS

| | | | | |
|---|---|---|---|---|
| 4,074,831 A | * | 2/1978 | Roach | B05B 11/3007 222/309 |
| 4,273,257 A | * | 6/1981 | Smith | B01L 3/0206 222/309 |
| 4,306,670 A | * | 12/1981 | Oshikubo | B01L 3/0282 222/309 |
| 4,429,904 A | | 2/1984 | Reimert | |
| 4,526,294 A | | 7/1985 | Hirschmann et al. | |
| 5,862,958 A | * | 1/1999 | Edwards | B01L 3/0206 222/309 |
| 6,135,325 A | * | 10/2000 | Fessel | G01F 11/028 222/309 |
| 8,142,738 B2 | | 3/2012 | Boehm et al. | |
| 8,245,887 B2 | | 8/2012 | Ohshima | |
| 8,597,593 B2 | | 12/2013 | Boehm et al. | |
| 8,668,117 B2 | | 3/2014 | Crossdale et al. | |
| 8,973,847 B2 | | 3/2015 | Iammatteo et al. | |
| 9,352,949 B2 | | 5/2016 | Rege et al. | |
| 2009/0123226 A1 | | 5/2009 | Viegener | |
| 2010/0021349 A1 | | 1/2010 | Boehm et al. | |
| 2011/0127298 A1 | * | 6/2011 | Shah | G01F 11/028 222/309 |
| 2013/0172477 A1 | | 7/2013 | Hintzer et al. | |
| 2015/0114997 A1 | * | 4/2015 | Uldry | B05B 11/3007 222/309 |
| 2016/0068380 A1 | | 3/2016 | Rege et al. | |
| 2016/0214127 A1 | * | 7/2016 | Bohm | B05B 11/3007 |
| 2016/0214846 A1 | * | 7/2016 | Hochholzer | B67C 3/26 |
| 2016/0214847 A1 | * | 7/2016 | Bohm | B67C 3/2634 |
| 2016/0214848 A1 | | 7/2016 | Böhm et al. | |
| 2016/0264391 A1 | * | 9/2016 | Hochholzer | B67C 3/26 |

FOREIGN PATENT DOCUMENTS

| | | |
|---|---|---|
| DE | 36 07 139 A1 | 9/1987 |
| DE | 198 00 709 A1 | 7/1999 |
| DE | 20 2009 012 054 U1 | 3/2011 |
| EP | 0 542 241 A2 | 5/1993 |
| EP | 1 236 976 A1 | 9/2002 |

* cited by examiner

CYLINDER-AND-PISTON ASSEMBLY FOR A BOTTLE ATTACHMENT APPARATUS

BACKGROUND OF THE INVENTION

Field of the Invention

The invention relates to a cylinder-and-piston assembly for a bottle attachment apparatus for handling liquids, and to a bottle attachment apparatus for handling liquids.

Description of Related Art

In the case of bottle attachment apparatuses for handling liquids, the focus is on precisely measuring and conveying liquids from a storage bottle or another storage container, wherein precise measuring is performed when a partial volume of liquid is received from the storage bottle or similar into the apparatus and/or when a partial volume of liquid is externally dispensed from the apparatus into a container.

Bottle attachment apparatuses of the type being discussed are in particular bottle top dispensers and burets. Bottle attachment apparatuses of this type are widely used in chemical, biological, and pharmaceutical laboratories and production facilities.

The term "liquid" in the present context preferably refers to liquids as are used in chemical, biological, and pharmaceutical laboratories and production facilities etc. These are preferably liquids having a relative viscosity of up to about 300 (viscosity relative to the viscosity of water, measured at normal conditions). In colloquial terms, the liquids are thus preferably those in the range of very low viscosity to slightly viscous.

In the case of bottle attachment apparatuses of the type being discussed, high requirements are set for volume accuracy of liquid intake and/or liquid dispensation, and for operator safety. The bottle attachment apparatuses are usually operated manually or else are driven by an actuator.

A typical example of a bottle attachment apparatus in the form of a bottle top dispenser is known from European Patent Application EP 0 542 241 A2. The present invention proceeds from this prior art. For bottle attachment apparatuses in the form of bottle top dispensers, the entire content of European Patent Application EP 0 542 241 A2 is incorporated by reference.

Here and hereunder, a bottle attachment apparatus is always described in the operating position thereof, that is to say in the position thereof when fastened to a storage bottle or similar, and when aligned in a substantially vertical manner. A valve block assembly for such a bottle attachment apparatus is also described in a corresponding manner, that is to say likewise in the operating position thereof, that is to say when installed in a bottle attachment apparatus in the operating position thereof.

A substantial component part of a bottle attachment apparatus of the type being discussed is the cylinder-and-piston assembly with the aid of which the liquid may be suctioned and exhausted again. Said cylinder-and-piston assembly has a cylinder which defines a longitudinal direction, and a piston which is guided in a sealed manner in the cylinder so as to be longitudinally displaceable. In the event of an upward movement of the piston in the cylinder, the liquid is suctioned by forming negative pressure in the cylinder. In the event of a downward movement, the liquid in the cylinder is exhausted again from the cylinder. The flow of the liquid during suctioning, on the one hand, and during exhausting, on the other hand, is directed by valves of the valve block assembly. The cylinder-and-piston assembly is connected in a sealing manner to the valve block assembly and to the lines which are located therein. The valve block assembly as such in turn is attached onto the storage bottle or similar with the aid of the fastening assembly.

An intake valve which allows liquid to be suctioned from the storage bottle by means of an intake pipe is located in the valve block of the valve block assembly. The intake pipe, most often in the form of a plug-fitted tube, extends deeply downward into the storage bottle. An exhaust line extends away from the valve block in an approximately horizontal manner. An exhaust valve sits in the exhaust line or in the valve block, so as to be at the beginning of the exhaust line. In some instances, the exhaust line has an additional switching valve by way of which a return flow line leading back into the storage bottle may be opened or closed. At a mouth opening from which the liquid exits, the exhaust line may have a closure.

Since the exhaust line protrudes from the valve block in an approximately horizontal manner and the previously discussed switching valve also often sits there, this is that side from which an operator works on the bottle attachment apparatus. This side may be referred to as the "front side" of the bottle attachment apparatus. The opposite side is the "rear side" of the bottle attachment apparatus. In the case of an electronic design embodiment of a bottle attachment apparatus, a display having corresponding operating elements is preferably located on the front side of the bottle attachment apparatus.

The fastening assembly for fastening the external housing and/or the valve block assembly of the bottle attachment apparatus onto a storage bottle or similar is often a thread assembly which is similar to a union nut, or is an internal thread which is incorporated into the valve block per se, for screwing onto the external thread on a bottleneck of the storage bottle (see the prior art mentioned at the outset). However, in principle other fastening assemblies, such as bayonet systems or short-stroke collets are likewise employable, as are systems of the type of a taper-ground joint, which are usual in laboratories.

The present focus is on the cylinder-and-piston assembly for a bottle attachment apparatus of the type being discussed, and in particular on the stroke length adjustment on the cylinder-and-piston assembly.

In the prior art (European Patent Application EP 0 542 241 A2) from which the invention proceeds the cylinder-and-piston assembly has a cylinder housing which is connected to the piston and externally encompasses the cylinder by way of an internal side which faces the cylinder and of an external side which faces away from the cylinder. The cylinder, by way of the central axis thereof, defines a longitudinal direction. By displacing the cylinder housing up and down in relation to the cylinder, the piston is correspondingly displaced in the cylinder and liquid is suctioned and exhausted by way of the cylinder-and-piston assembly.

The upward stroke length of the piston in the cylinder is delimited by a fixed stop which interacts with a stroke length stop on the cylinder housing. The cylinder housing has a longitudinal slot running in the longitudinal direction, in which the stroke length stop is interlockable in the respectively adjusted position. A scale is located on the external side of the cylinder housing beside the longitudinal slot. The volume which has been adjusted for the liquid by way of the stroke length stop may be identified by way of the scale.

The downward stroke length of the piston is delimited by the lower end face of the piston, which bears on the upper side of the valve block. This prior art does not have a stroke length adjustment for the adjustable volume. Tuning of the indicated value on the scale to the liquid volume which is actually conveyed is not possible and must be performed by made-to-measure manufacturing. Any requirement for tuning which arises during use cannot be corrected.

Bottle attachment apparatuses for handling liquids are known in the prior art from the general catalog of the applicant (BRAND general catalog 900 (June 2013)). Bottle attachment apparatuses of the type being discussed are comprehensively explained therein in terms of construction and application. The "Dispensette" listed therein has a stroke length adjustment, and any change to the ex-works adjustment is visually displayed.

Overall, the known cylinder-and-piston assembly having the stroke length adjustment in terms of operation is in need of improvement. The teaching is therefore based on the issue of improving a cylinder-and-piston assembly for a bottle attachment apparatus for handling liquids in terms of cost-effective manufacturing, ergonomical handling, and access to the stroke length adjustment in practical use.

SUMMARY OF THE INVENTION

According to the invention there is provided a cylinder-and-piston assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the cylinder-and-piston assembly has a cylinder which is attachable to the valve block assembly and by way of its central axis defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder, wherein the piston is displaceable in the cylinder by displacing the cylinder housing, and wherein the stroke length of the piston in the cylinder is delimited by a fixed stop which interacts with a stroke length stop on the cylinder housing and is disposed on the cylinder, wherein the stroke length of the piston when suctioning from the cylinder is delimited by the stroke length stop and when exhausting into the cylinder is delimited by a readjustment stop which is disposed on the piston or on the cylinder housing and interacts with the fixed stop, wherein the readjustment stop is accessible and adjustable by way of a removable seal, wherein the seal is connected by way of ribs to a piston bearing, wherein the readjustment stop is disposed below the removable seal, and wherein the seal has a molding and the piston bearing has a counter molding, and displacement of the seal in relation to the piston bearing moves the seal in a movement in the longitudinal direction, the seal being hereby removed.

The molding together with the counter molding facilitates manual separation of the seal.

Movement is advantageously performed as a rotational movement, on account of which the seal in relation to the piston bearing by way of the molding and counter molding is removed in a manner perpendicular to the rotation axis so as not to be capable of re-assembly. This is particularly easy by hand, employing a manually guided tool.

In order for any adjustment of the readjustment stop to be made visible, the seal in a particular design is not capable of re-assembly on the piston bearing and a potential adjustment is identifiable once said seal has been removed. That is to say that the seal once initially removed is incapable of being fixedly assembled in the same manner again.

The molding and the counter molding are advantageously embodied as tapered faces. An external taper is disposed on the seal, and an internal taper is disposed on the piston bearing. This arrangement may also be implemented in a reversed manner, because movement of the seal toward the piston bearing and thus movement of the tapered faces toward one another causes separation of the seal in the longitudinal direction. The tapered faces constitute a mechanical gear and convert the displacement of the seal into a movement for separation.

The molding and the counter molding may also be embodied as toothings. To this end, the pairs of teeth in the longitudinal direction are axially aligned and mutually engaged. Relative displacement of the pairs of teeth causes separation in the longitudinal direction. In the case of displacement by way of a rotational movement, a toothing in the form of a Hirth joint having mutually opposed teeth in crown-gear form is advantageous.

Displacement of the seal is facilitated by the employment of a manually guided tool, to which end the seal has a contour which is connectable to a tool in a form-fitting manner, and the seal is removed by the tool which is connected by way of the contour. It is best for the tool to engage in the contour in a form-fitting manner.

Depending on the embodiment of the molding and of the counter molding, the contour in relation to the molding and counter molding is disposed on the seal so as to be centric or eccentric. In the case of crown gears, the contour is concentric therewith and centric in relation to the longitudinal direction. In the case of tapered faces, an arrangement which is eccentric in relation to the contour is helpful for separation.

The piston bearing is designed in a particularly ergonomical manner if the former on the upper side thereof is provided with a depression, and the seal is disposed in the depression so as to be flush with the upper side of the piston bearing or so as to be slightly depressed. In this way, said piston bearing does not interfere with manual actuation, and cleaning of the cylinder-and-piston assembly is facilitated. Displacement of the seal simultaneously by way of the molding and counter molding causes the seal to be moved out of the depression.

Depending on the embodiment of the molding and of the counter molding, separation of the ribs which connect the seal to the piston bearing is facilitated by the arrangement of said ribs. The ribs are disposed on the seal and on the piston bearing so as to be centric or eccentric in relation to the molding and the counter molding. In an advantageous design, the ribs have default breaking points.

According to a further and independent teaching of the invention there is provided a cylinder-and-piston assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, and a fastening assembly for fastening the external housing and/or the valve block assembly on a storage bottle or the like, wherein the cylinder-and-piston assembly has a cylinder which is attachable to the valve block assembly and by way of its central axis defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder, wherein the piston is displaceable in the cylinder by displacing the cylinder housing, and wherein the stroke length of the piston in the cylinder is delimited by a fixed stop which interacts with a stroke length stop on the cylinder housing and is disposed on the cylinder, wherein the stroke length of the piston when suctioning from the cylinder is delimited by the stroke length stop and when exhausting into the cylinder is delimited by a readjustment stop which is disposed on the piston or on the cylinder housing and interacts with the fixed stop, wherein the readjustment stop is accessible and adjustable by way of a removable seal, wherein the seal is disposed on a piston bearing, wherein the piston is inserted in a receptacle opening of the piston bearing, and wherein a ventilation opening is disposed below the seal and opens into the receptacle opening.

The ventilation opening of simple design during assembly and in the case of temperature variations provides for pressure equalization in the receptacle opening. An insert which covers the ventilation opening even when the seal is removed is advantageously disposed below the seal. This construction is preferably combined with the first teaching of the invention explained above.

The subject matter of the invention is not only the afore-described cylinder-and-piston assembly for a bottle attachment apparatus for handling liquids, but also and in particular a bottle attachment apparatus for handling liquids, the cylinder-and-piston assembly of which is designed according to the invention in the manner discussed above.

The invention will be explained in more detail in the following by means of a drawing which merely illustrates a preferred exemplary embodiment. In the drawing:

DETAILED DESCRIPTION OF THE INVENTION

Figure 1:
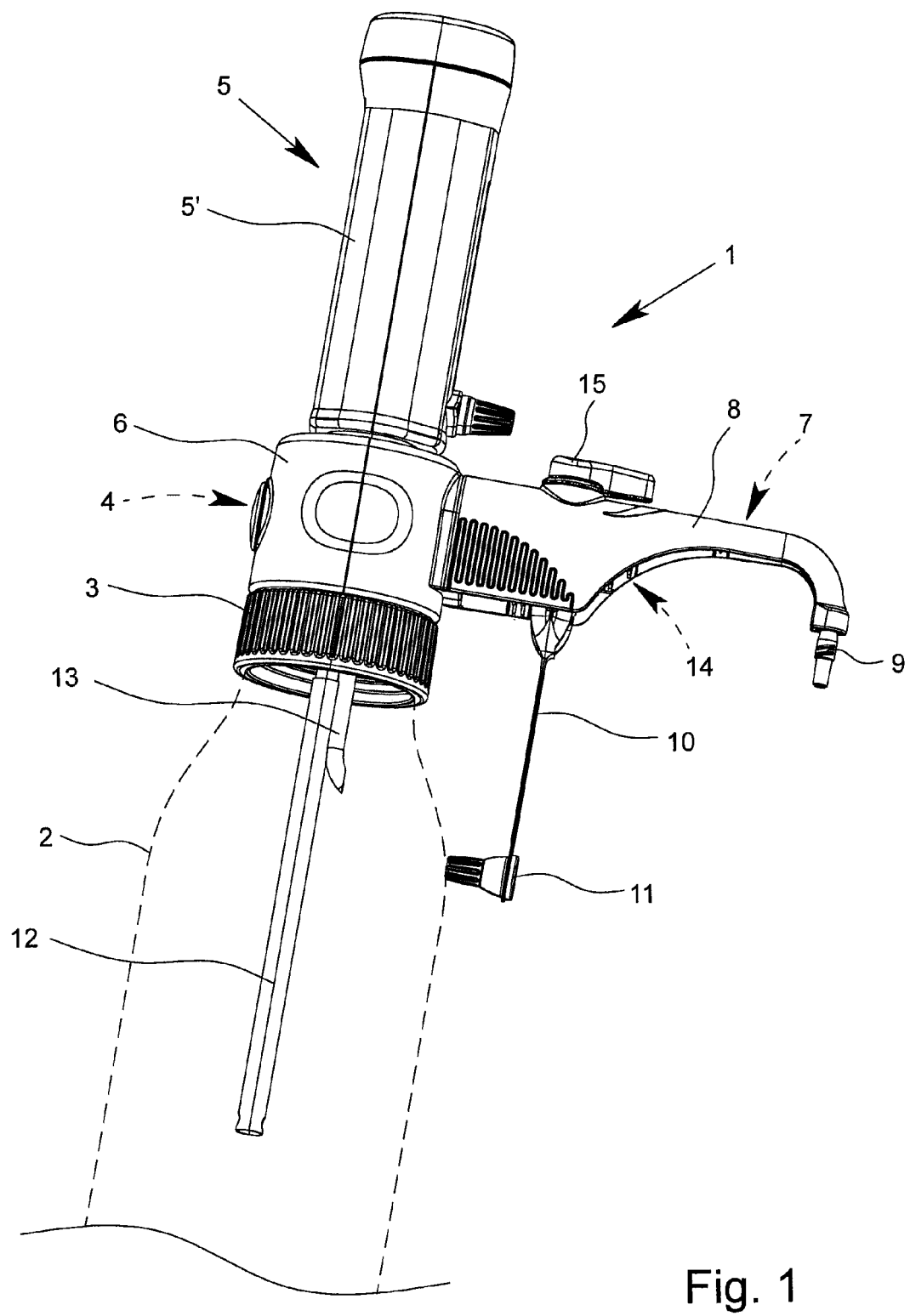
FIG. 1 shows a bottle top apparatus for handling liquids, in the form of a bottle top dispenser, in a perspective view.
Figure 2:
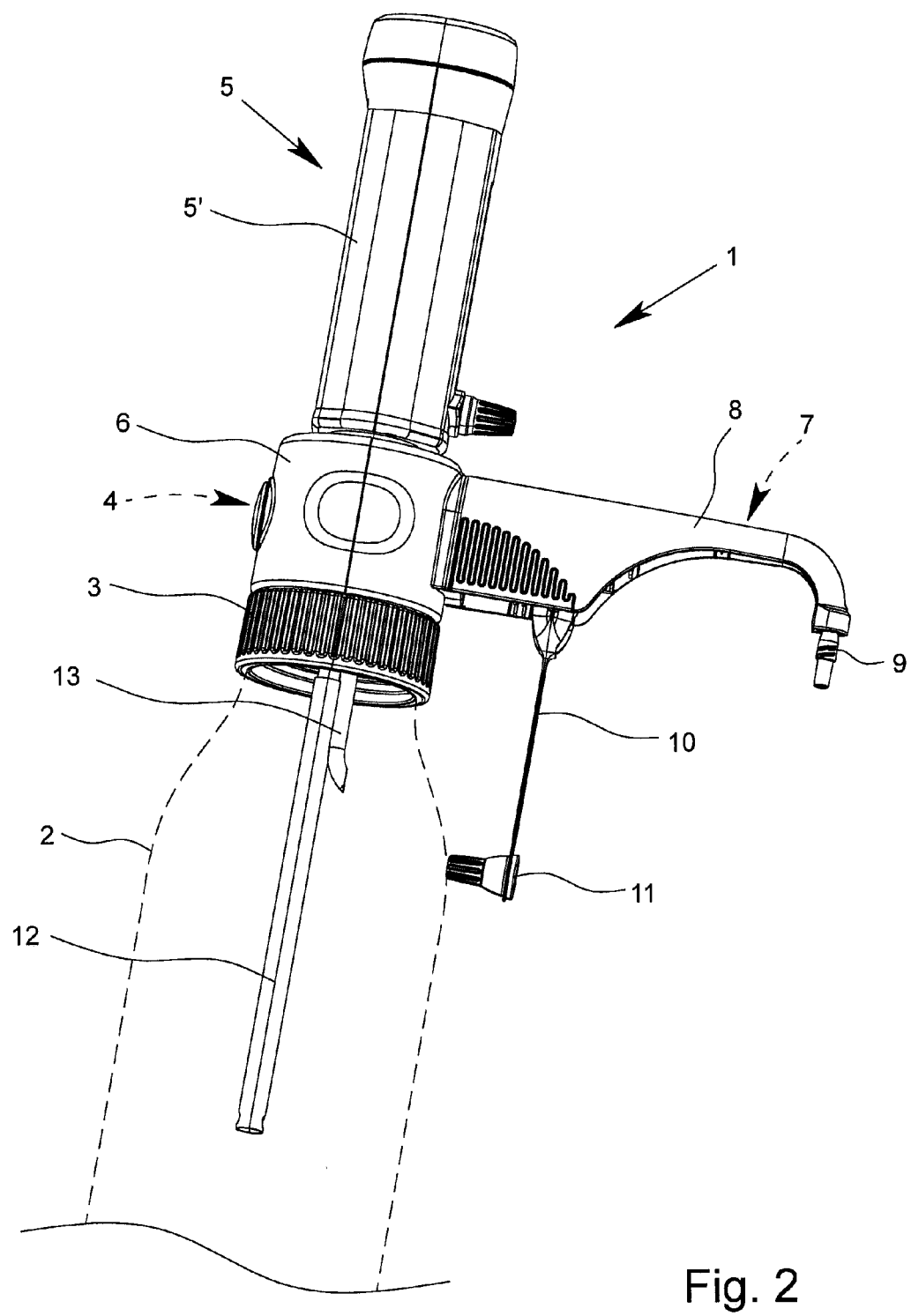
FIG. 2 shows the bottle attachment apparatus from FIG. 1, but without a switching valve in the exhaust line, in a perspective view.

FIGS. 1 and 2 show, in each case, a preferred exemplary embodiment of a bottle attachment apparatus 1 according to the invention for handling liquids, herein in the form of a bottle top dispenser.

In general terms, in respect of bottle attachment apparatuses for handling liquids, i.e., so-called "liquid handling" apparatuses, reference may be made to the general catalog of the applicant (BRAND general catalog 900 (June 2013)). Bottle attachment apparatuses of the type being discussed are comprehensively explained therein in terms of construction and application. Moreover, in respect of bottle attachment apparatuses of the type being discussed, reference may also be made to the sources of the prior art, as stated at the outset.

The definitions pertaining to top and bottom, and to front and rear, which have been stated at the outset of the description, apply to the bottle attachment apparatus which is described here in the preferred exemplary embodiment. The bottle attachment apparatus 1 will always be discussed in the position which is illustrated in FIG. 1, so as to be on a storage bottle 2 as a preferred example of a storage container, even when said bottle attachment apparatus is not shown in this position in the individual illustrations.

During operation, the bottle attachment apparatus 1 which is illustrated in FIGS. 1 and 2 is attached to a storage bottle 2. More specifically, the bottle attachment apparatus 1 with the aid of a fastening assembly 3 is attached to the bottleneck of the storage bottle 2. If the bottleneck of the storage bottle 2 has an external thread, the fastening assembly 3 may be, for example, a type of annular cap having an internal thread, said annular cap being attached at the bottom of the bottle attachment apparatus 1. However, the fastening assembly 3 may also be configured in the form of a stopper-like plug assembly, or assume other shapes. It is only essential that the bottle attachment apparatus 1 by means of the fastening assembly 3 may be securely fastened to the storage bottle 2 or to any other matching storage container.

The cylinder-and-piston assembly 5 of the bottle attachment apparatus 1 can be seen at the top of FIGS. 1 and 2. The bottle attachment apparatus 1 presently has a cylinder-and-piston assembly 5 having an external cylinder housing which encompasses the cylinder. A mechanical and readjustment stroke length stop is located on said cylinder housing.

A valve block assembly 4 supports the cylinder-and-piston assembly 5, but the former as such according to the preferred teaching here is located in an external housing 6 of the bottle attachment apparatus 1, that is to say that said valve block assembly 4 is not directly identifiable in FIG. 1. The fastening assembly 3 as such is located on the valve block assembly 4 or, as is the case here, on the external housing 6.

An exhaust line 7 forwardly protrudes from the external housing 6 of the bottle attachment apparatus 1, said exhaust line 7 in the illustrated exemplary embodiment being disposed and guided in a cantilever-type mount 8 which is of angular design. The exhaust line 7 terminates at a tip 9. A mounting lug 10 which holds a closure cap 11, by way of which the mouth opening 9' on the tip 9 may be closed off and protected against dripping liquid, is fastened to the mount 8.

An intake line 12 for liquid extends downward from the valve block assembly 4, which is hidden in the external housing 6, into the storage bottle 2. Besides the intake line 12, a return flow line 13 through which liquid may be directed back into the storage bottle 2 instead of through the exhaust line 7, if required, can be seen in FIG. 1.

A switching valve 14 which is suitable for returning the flow of liquid into the storage bottle 2 and which is actuatable by means of a toggle 15 on the upper side of the mount 8, here is located outside the valve block assembly 4 and outside the external housing 6, and in the preferred exemplary embodiment illustrated in FIG. 1 is located within the mount 8 for the exhaust line 7.

FIG. 2 shows a bottle attachment apparatus 1 in the form of a bottle top dispenser without a switching valve 14, that is to say without the "return dosing" function, which is explained in detail in the prior art (European Patent Application EP 0 542 241 A2). In this case, the return flow line 13 is of course also missing.

Figure 3:
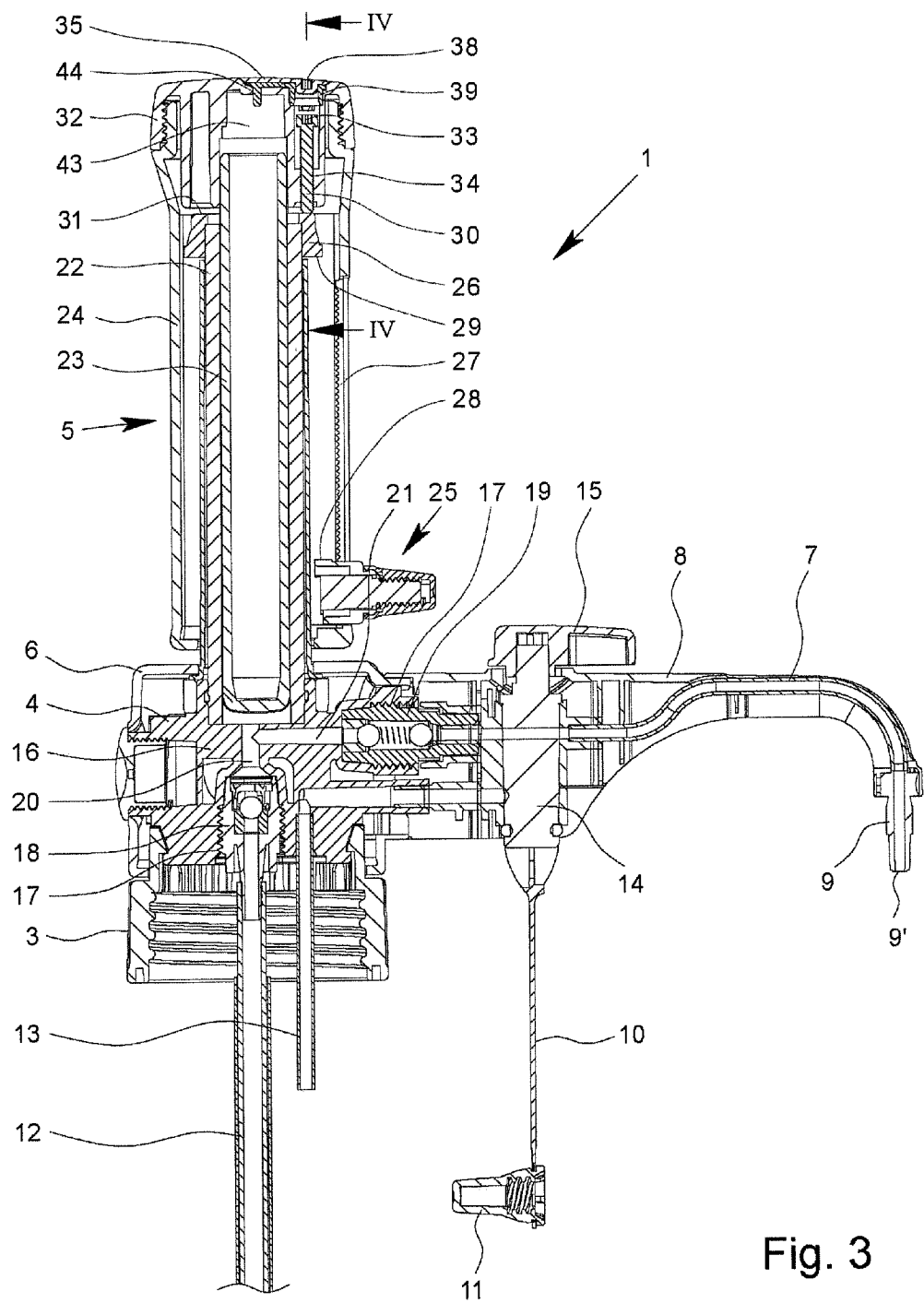
FIG. 3 shows the bottle attachment apparatus from FIG. 1 in a sectional view in the region of the valve block assembly.

FIG. 3 shows the bottle attachment apparatus 1 from FIG. 1 in a sectional view. Here, the valve block assembly 4 can be seen in the external housing 6. The valve block assembly 4 is typically composed of plastics, in particular of plastics resistant to chemicals. The valve block assembly 4 has a multiplicity of ducts and installed elements, for which reference in detail may be made to the prior art which has been discussed at the outset.

The valve block assembly 4 presently shows a valve block 16, an intake valve insert 18, and an exhaust valve insert 19, and in the valve block 16 in each case one valve receptacle 17 which is assigned to the valve insert 18, 19.

The intake valve insert 18 is located in the downwardly oriented intake valve receptacle 17 in the valve block 16, the intake line 12 adjoining the former in a downward manner into the storage bottle 2. Toward the top, an intake duct 20, which leads to the cylinder 22 of the cylinder-and-piston assembly 5, adjoins the intake valve receptacle 17 in the valve block 16. An exhaust duct 21 in the valve block 16, which is directed to the right in FIG. 3, branches off from the intake duct 20, said exhaust duct 21 leading into the exhaust valve receptacle 17 in which the exhaust valve insert 19 is located.

In the preferred exemplary embodiment illustrated, the switching valve 14 in the flow direction of the liquid is located behind the exhaust valve insert 19. This may be readily seen in FIG. 3. However, there are also solutions in terms of construction in which the sequence is reversed, that is to say that the switching valve in the flow direction is ahead of the exhaust valve.

As can be clearly seen in FIG. 3, the cylinder-and-piston assembly 5 has a cylinder 22 which by way of the central axis thereof defines a longitudinal direction, a piston 23 which is displaceable in a sealed manner in the longitudinal direction in the cylinder 22, and a cylinder housing 24 which is connected to the piston 23 and externally encompasses the cylinder 22 by way of an internal side which faces the cylinder 22 and of an external side which faces away from the cylinder 22. The external side of the cylinder housing 24 may be seen in FIGS. 1 and 2.

The piston 23 is also displaceable in the cylinder 22 by displacing the cylinder housing 24 in relation to the cylinder 22. The upward stroke length of the piston 23 out of the cylinder 22 in FIG. 3 causes liquid to be suctioned into the cylinder 22, said upward stroke length being delimited by a fixed stop 26 which is disposed on the cylinder 22 and interacting with a stroke length stop 25 on the cylinder housing 24. In the preferred exemplary embodiment illustrated, the fixed stop 26 is disposed in an annular manner at the upper end of the cylinder 22 which here is composed of glass. On account thereof, the fixed stop 26 is independent of the rotational position of the cylinder housing 24 in relation to the cylinder 22.

The cylinder housing 24 has a longitudinal slot 27 running in the longitudinal direction (FIG. 3), and on the external side has a scale (not shown) assigned to the longitudinal slot 27. The scale may be disposed on the right or on both sides on the longitudinal slot 27 on the cylinder housing 24. The stroke length stop 25 on the cylinder housing 24 is adjustable in the longitudinal slot 27 in the longitudinal direction and is interlockable in the respective position. FIG. 3 shows the lowermost position of the stroke length stop 25, and thus the longest stroke length for the cylinder housing 24 having the piston 23. The illustrated exemplary embodiment shows the stroke length stop 25 having a stop face 28 which impacts on the lower side 29 of the fixed stop 26.

In FIG. 3, the piston 23 is pushed into the cylinder 22 to the maximum. The downward stroke of the piston 23 in the cylinder 22 in FIG. 3 causes liquid to be exhausted from the cylinder 22 into the exhaust line 7 and out of the mouth opening 9'. This stroke is delimited by an readjustment stop 30 which interacts with the fixed stop 26, the upper side 31 of the latter delimiting the stroke. In the illustrated exemplary embodiment the readjustment stop 30 is disposed in a piston bearing 32 which interconnects the piston 23 and the cylinder housing. The readjustment stop 30 may thus also be disposed on the piston 23 or on the cylinder housing 24.

In the illustrated exemplary embodiment the readjustment stop 30 in the form of a screw is provided with a contour 33 for a tool (not illustrated) and with an adjusting thread 34. A matching counter thread is disposed in the piston bearing 32 and allows displacement of the readjustment stop 30 in the longitudinal direction in relation to the piston bearing 32. The stroke of the piston 23, which has been adjusted by way of the stroke length stop 25, is readjusted by displacing the readjustment stop 30.

In order for the readjustment to be safeguarded, access to the readjustment stop 30 on the piston bearing 32 is closed off by a seal 35. In the illustrated exemplary embodiment, access is provided at the top in a depression on the piston bearing 32. The seal 35 is removable by the user.

Seal 35 is removed by displacing the seal 35 in relation to the piston bearing 32. For facilitation, the seal 35 has a molding 36 and the piston bearing 32 has a counter molding 37, on account of which the seal 35 is moved in a movement in the longitudinal direction, the seal 35 being hereby removed.

Displacement is preferably performed by way of a tool, and the seal 35 here is removed by a rotational movement, wherein the molding and counter molding 36, 37 allow for removal of the seal 35 in a manner perpendicular to the rotation axis.

In order for the potential readjustment of the readjustment stop 30 to be indicated, the latter is disposed below the seal 35, and the seal 35 is not capable of being fixedly re-assembled. However, the seal may indeed be designed such that it may be re-applied, but not in the same state as prior to initial removal.

In the illustrated exemplary embodiment an external taper 36 is molded on the seal and an internal taper 37 is molded on the piston bearing 32 as a molding and counter molding, respectively. Teeth which are axially aligned in the longitudinal direction and which are mutually engaging may also be provided as a molding and counter molding 36, 37.

The seal 35, for use with the tool and for connecting thereto, has a mating form-fitting contour 38. The seal 35 is in this way removed by the tool which is connected by way of the contour 38. The contour 38 is preferably disposed on the seal 35 so as to be centric, in the embodiment as teeth, or eccentric with tapers in relation to the molding and counter molding 36, 37.

An embodiment in which displacement of the seal 35 in relation to the piston bearing 32 is performed in a transverse manner to the longitudinal direction, and in which the molding and counter molding 36, 37 here enable the seal 35 to be lifted and removed over a type of oblique plane in the longitudinal direction, is not illustrated.

Figure 4:
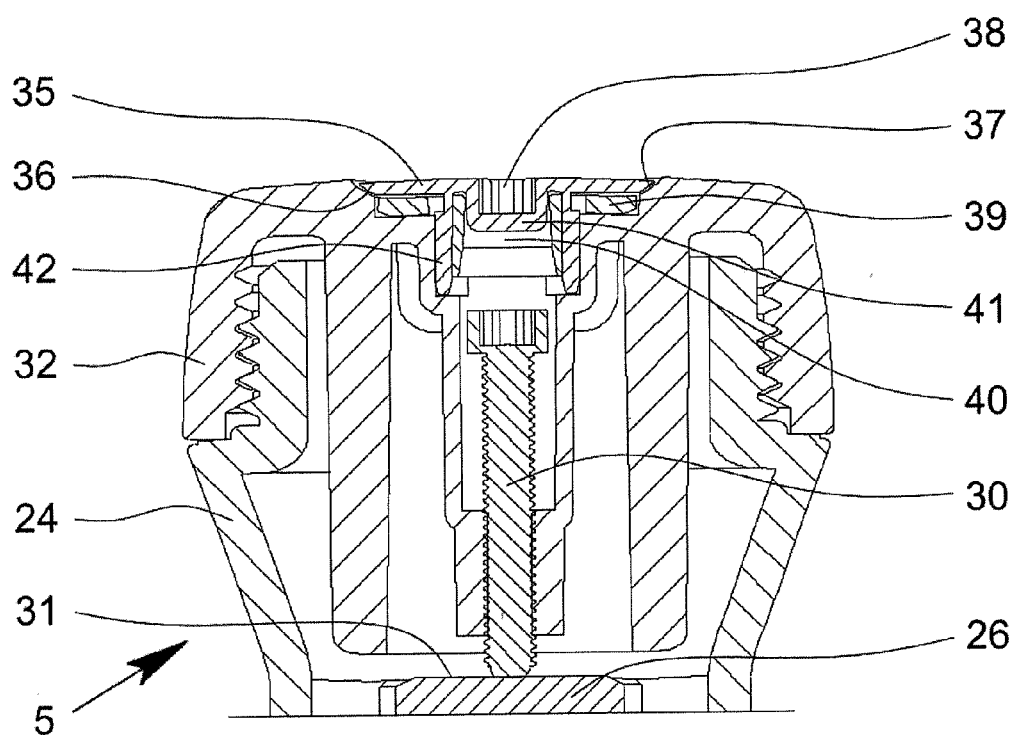
FIG. 4 shows a section through the cylinder-and-piston assembly in FIG. 3, along the line IV-IV indicated in the latter.

The seal 35 disposed in the depression on the piston bearing 32, terminating so as to be flush with or slightly depressed on the upper side of the piston bearing 32, is illustrated in FIGS. 3 and 4.

A colored insert 39 having an opening 40 as access to the contour 33 in the readjustment stop 30 is provided in the depression below the seal 35. A molding for the contour 38 in the seal 35 protrudes into this opening 40 and constitutes a trunnion 41 in the opening 40, or the rotation axis, respectively. The rotation axis, that is to say the opening 40, and the molding of the contour 38 may be disposed so as to be centric in relation to the seal 35. In the exemplary embodiment illustrated and shown in FIG. 3 the rotation axis is eccentric in relation to the seal 35.

As is illustrated in FIG. 4, the seal 35 is provided with two ribs 42 which hold the seal in the piston bearing 32. The ribs 42 have restrictions as default breaking points. They protrude through the insert 39 and are disposed so as to be opposite and next to the opening 40. By way of the insert 39 the ribs 42 below the default breaking points thereof are non-releasably tensioned in relation to the piston bearing 32 and fixedly held.

As can be seen in FIG. 4, the ribs 42 provided on the seal 35 and on the piston bearing 32 are disposed so as to be centric in relation to the trunnion 41 and opening 40 in the insert 39. The ribs 42, and the rotation axis which is visible in FIG. 3 and formed by the trunnion 41 and by the opening 40, are disposed so as to be eccentric in relation to the molding and counter molding 36, 37. The eccentric embodiment of the ribs 42 may also be implemented so as to be centric.

The seal 35 is removed by means of the tool which is connected by way of the contour 38, by rotation about the rotation axis which is formed by the trunnion 41 and the opening 40. On account of rotation, the molding and counter molding 36, 37 which are visible in FIGS. 3 and 4, of the external taper 36 and the internal taper 37, are mutually displaced and, due to the eccentricity of the rotation axis in relation to the tapers 36, 37 slide on top of one another and, on account thereof, implement the movement in the longitudinal direction. The displacement of the tapers 36, 37 on top of one another is possible since the seal 35 is also deformed. On account of the movement in the longitudinal direction, the ribs 42 are exposed to tensile forces and, on account of the rotational displacement, exposed to bending stresses, and thus easily break off during further displacement. Displacement and breaking off is facilitated by the deformation of the seal 35 and by the asymmetrical tensile forces which arise on the ribs.

According to a further preferred teaching of the invention, the piston 23 is inserted in a receptacle opening 43 of the piston bearing 32, wherein the piston 23 sits with a press-fit in a receptacle opening 43. It is illustrated in FIG. 3 that, on account thereof, the air space behind the piston is enclosed and that positive pressure is established in the receptacle opening 43 on account of the type of connection.

According to the invention a ventilation opening 44, which opens into the receptacle opening 43 and in this way enables pressure equalization with the ambient air, is disposed below the seal 35. The seal 35 here is disposed on the piston bearing 32 and covers the ventilation opening 44.

It is furthermore illustrated in FIG. 3 that an insert 39 is located below the seal 35. This insert 39 still covers the ventilation opening 44 when the seal 35 has been removed. The insert 39 preferably has a pin which is plugged into the ventilation opening 44 in a non-sealing manner and fixes the insert 39 on the piston bearing 32.

It is derived from the entire illustration in the above explanations that the teaching of the invention relates not only to a cylinder-and-piston assembly 5 for a bottle attachment apparatus 1 as a replacement part, but that the teaching of the invention very particularly also relates to a bottle attachment apparatus 1 in which a cylinder-and-piston assembly 5 according to the invention is employed. To this extent, reference may be made to the preceding explanations.

This description uses examples to disclose the invention including the best mode enabling any person skilled in the art to make and use the invention. The patentable scope of the invention, however, is defined by the claims, and may include other examples that occur to those skilled in the art. Such other examples are intended to be within the scope of the claims if they have structural elements that do not differ from the literal language of the claims, or if they include structural elements equivalent to the structural elements covered by the literal language of the claims.

What is claimed is:

1. A cylinder-and-piston assembly for a bottle attachment apparatus for handling liquids, comprising:
   a cylinder-and-piston assembly for suctioning and exhausting liquid,
   a valve block assembly, and
   a fastening assembly for fastening valve block assembly on a storage bottle,
   wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
   wherein the piston is displaceable in the cylinder by displacing the cylinder housing, and wherein a stroke length of the piston in the cylinder is delimited by a fixed stop which interacts with a stroke length stop on the cylinder housing and is disposed on the cylinder,
   wherein the stroke length of the piston when suctioning from the cylinder is delimited by the stroke length stop and when exhausting into the cylinder is delimited by a readjustment stop which is disposed on the piston or on the cylinder housing and interacts with the fixed stop,
   wherein the readjustment stop is accessible and adjustable by way of a removable seal,
   wherein the seal is connected by way of ribs to a piston bearing,
   wherein the readjustment stop is disposed below the removable seal, and
   wherein the seal has a molding and the piston bearing has a counter molding, and displacement of the seal in relation to the piston bearing moves the seal in the longitudinal direction, the seal being hereby removed.

2. The cylinder-and-piston assembly as claimed in claim 1, wherein the seal is removable by a rotational movement which is performed in relation to the piston bearing.

3. The cylinder-and-piston assembly as claimed in claim 2, wherein the seal in relation to the piston bearing is removable by way of the molding and counter molding in a direction perpendicular to the rotation axis.

4. The cylinder-and-piston assembly as claimed in claim 2, wherein the seal is removable by means of a tool.

5. The cylinder-and-piston assembly as claimed in claim 2, wherein the seal is removable in a manner preventing re-assembly.

6. The cylinder-and-piston assembly as claimed in claim 1, wherein the molding on the seal has an external taper and the counter molding on the piston bearing has an internal taper, or vice versa.

7. The cylinder-and-piston assembly as claimed in claim 1, wherein the molding and counter molding are mutually engaging teeth which are directed so as to be axial to the longitudinal direction.

8. The cylinder-and-piston assembly as claimed in claim 1, wherein the seal has a contour which is connectable to a tool in a form-fitting manner, and that the seal is removed by the tool which is connected by way of the contour.

9. The cylinder-and-piston assembly as claimed in claim 8, wherein the contour on the seal in relation to the molding and counter molding is disposed so as to be centric or eccentric.

10. The cylinder-and-piston assembly as claimed in claim 1, wherein the piston bearing on the upper side thereof is provided with a depression, and the seal is disposed in the depression so as to be flush with the upper side of the piston bearing or so as to be slightly depressed.

11. The cylinder-and-piston assembly as claimed in claim 1, wherein the ribs are provided on the seal and on the piston bearing and have default breaking points.

12. A cylinder-and-piston assembly for a bottle attachment apparatus for handling liquids, comprising:
a cylinder-and-piston assembly for suctioning and exhausting liquid,
a valve block assembly, and
a fastening assembly for fastening the valve block assembly on a storage bottle,
wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
wherein the piston is displaceable in the cylinder by displacing the cylinder housing,
wherein a stroke length of the piston in the cylinder is delimited by a fixed stop which interacts with a stroke length stop on the cylinder housing and is disposed on the cylinder,
wherein the stroke length of the piston when suctioning from the cylinder is delimited by the stroke length stop and when exhausting into the cylinder is delimited by a readjustment stop which is disposed on the piston or on the cylinder housing and interacts with the fixed stop,
wherein the readjustment stop is accessible and adjustable by way of a removable seal,
wherein the seal is disposed on a piston bearing,
wherein the piston is inserted in a receptacle opening of the piston bearing, and
wherein a ventilation opening is disposed below the seal and opens into the receptacle opening.

13. The cylinder-and-piston assembly as claimed in claim 12, wherein an insert which covers the ventilation opening even when the seal is removed is disposed below the seal.

14. The cylinder-and-piston assembly as claimed in claim 12, wherein the readjustment stop is disposed below the removable seal, wherein the seal has a molding and the piston bearing has a counter molding, and wherein displacement of the seal in relation to the piston bearing moves the seal in a movement in the longitudinal direction, the seal being removed thereby.

15. A bottle attachment apparatus for handling liquids, comprising:
a cylinder-and-piston assembly for suctioning and exhausting liquid,
a valve block assembly, and
a fastening assembly for fastening the valve block assembly on a storage bottle,
wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
wherein the piston is displaceable in the cylinder by displacing the cylinder housing,
wherein a stroke length of the piston in the cylinder is delimited by a fixed stop which interacts with a stroke length stop on the cylinder housing and is disposed on the cylinder,
wherein the stroke length of the piston when suctioning from the cylinder is delimited by the stroke length stop and when exhausting into the cylinder is delimited by a readjustment stop which is disposed on the piston or on the cylinder housing and interacts with the fixed stop,
wherein the readjustment stop is accessible and adjustable by way of a removable seal,
wherein the seal is connected by way of ribs to a piston bearing,
wherein the readjustment stop is disposed below the removable seal, and
wherein the seal has a molding and the piston bearing has a counter molding, and displacement of the seal in relation to the piston bearing moves the seal in the longitudinal direction, the seal being removed thereby.

16. A bottle attachment apparatus for handling liquids, comprising:
a cylinder-and-piston assembly for suctioning and exhausting liquid,
a valve block assembly, and
a fastening assembly for fastening the valve block assembly on a storage bottle,
wherein the cylinder-and-piston assembly has a cylinder which is attachable to the valve block assembly, a central axis that defines a longitudinal direction, a piston which is displaceable in a sealed manner in the longitudinal direction in the cylinder, and a cylinder housing which is connected to the piston and externally encompasses the cylinder by way of an internal side which faces the cylinder and of an external side which faces away from the cylinder,
wherein the piston is displaceable in the cylinder by displacing the cylinder housing,
wherein a stroke length of the piston in the cylinder is delimited by a fixed stop which interacts with a stroke length stop on the cylinder housing and is disposed on the cylinder,
wherein the stroke length of the piston when suctioning from the cylinder is delimited by the stroke length stop and when exhausting into the cylinder is delimited by a readjustment stop which is disposed on the piston or on the cylinder housing and interacts with the fixed stop,
wherein the readjustment stop is accessible and adjustable by way of a removable seal,
wherein the seal is disposed on a piston bearing, wherein the piston is inserted in a receptacle opening of the piston bearing, and wherein a ventilation opening is disposed below the seal and opens into the receptacle opening.

* * * * *